US012504720B2

(12) United States Patent
Mojon et al.

(10) Patent No.: US 12,504,720 B2
(45) Date of Patent: Dec. 23, 2025

(54) DEVICE ENABLING A TIMEPIECE MOVEMENT TO DISPLAY THE TIME IN A PREDEFINED TIME ZONE

(71) Applicant: LA MONTRE HERMÈS S.A., Brügg (CH)

(72) Inventors: Jean-François Mojon, Les Hauts-Geneveys (CH); Xavier Clement, Fournets Luisans (FR); Thomas Funder-Nielsen, Zurich (CH)

(73) Assignee: LA MONTRE HERMÈS S.A., Brügg (CH)

( * ) Notice: Subject to any disclaimer, the term of this patent is extended or adjusted under 35 U.S.C. 154(b) by 298 days.

(21) Appl. No.: 18/255,929

(22) PCT Filed: Dec. 3, 2021

(86) PCT No.: PCT/EP2021/084101
§ 371 (c)(1),
(2) Date: Jun. 5, 2023

(87) PCT Pub. No.: WO2022/122569
PCT Pub. Date: Jun. 16, 2022

(65) Prior Publication Data

US 2024/0036520 A1 Feb. 1, 2024

(30) Foreign Application Priority Data

Dec. 7, 2020 (CH) .................................... 01549/20

(51) Int. Cl.
*G04B 19/22* (2006.01)

(52) U.S. Cl.
CPC .................................. *G04B 19/223* (2013.01)

(58) Field of Classification Search
CPC .................................................... G04B 19/223
See application file for complete search history.

(56) References Cited

U.S. PATENT DOCUMENTS

| | | | | |
|---|---|---|---|---|
| 2,461,599 A | | 2/1949 | Pierre | |
| 3,628,322 A | * | 12/1971 | McDuffee | G04B 19/26 968/207 |

(Continued)

FOREIGN PATENT DOCUMENTS

| | | | |
|---|---|---|---|
| CH | 702422 A2 | 6/2011 | |
| CH | 710811 A2 | 9/2016 | |

(Continued)

OTHER PUBLICATIONS

International Search Report for PCT/EP2021/084101 mailed Mar. 14, 2022, 4 pages.

(Continued)

*Primary Examiner* — Edwin A. Leon
*Assistant Examiner* — Jason M Collins
(74) *Attorney, Agent, or Firm* — NIXON & VANDERHYE

(57) ABSTRACT

Disclosed is a display device for a timepiece movement including: an hour display wheel for a predefined time zone; and a chassis pivotable to cooperate with indications that are static relative to the frame of the timepiece movement to display information, the respective angular positions of the chassis and of the hour display wheel being indexed relative to each other so the angular position of the chassis is associated with the display of information relating to the predefined time zone. The device further includes a selection mechanism arranged: to rotate the hour display wheel, responsive to a predefined action by a user, between first and second positions associated with respective first and second time zones; and to simultaneously rotate the chassis in steps
(Continued)

so that the chassis moves from a first position, associated with the first time zone, to a second position, associated with the second time zone.

20 Claims, 3 Drawing Sheets

(56) References Cited

U.S. PATENT DOCUMENTS

| | | | | |
|---|---|---|---|---|
| 3,745,762 | A | 7/1973 | Kocher et al. | |
| 4,541,725 | A * | 9/1985 | Baumgartner | G04B 19/241 968/176 |
| 4,972,393 | A * | 11/1990 | Sase | G04C 17/0066 968/572 |
| 5,103,434 | A | 4/1992 | Sullivan | |
| 7,307,917 | B2 * | 12/2007 | Meylan | G04B 19/241 368/37 |
| 2010/0054088 | A1 * | 3/2010 | Lin | G04G 9/0076 368/22 |
| 2011/0205852 | A1 * | 8/2011 | Zaugg | G04B 19/223 368/21 |
| 2012/0020192 | A1 * | 1/2012 | Calabrese | G04F 7/0885 368/106 |
| 2013/0100780 | A1 | 4/2013 | Lin | |
| 2014/0321247 | A1 * | 10/2014 | Cattaneo | G04B 27/023 368/27 |
| 2019/0324400 | A1 * | 10/2019 | Bravo | G04B 19/06 |

FOREIGN PATENT DOCUMENTS

| | | | |
|---|---|---|---|
| CH | 715546 | A2 | 5/2020 |
| EP | 0921451 | A1 | 6/1999 |
| EP | 1845424 | A2 | 10/2007 |
| EP | 1845424 | A3 | 9/2010 |
| JP | S4991460 | A | 8/1974 |
| JP | S5119857 | U | 2/1976 |
| JP | H0263486 | U | 5/1990 |
| JP | 2013088428 | A | 5/2013 |
| JP | 2014044071 | A | 3/2014 |

OTHER PUBLICATIONS

Written Opinion of the ISA for PCT/EP2021/084101 mailed Mar. 14, 2022, 7 pages.

* cited by examiner

DEVICE ENABLING A TIMEPIECE MOVEMENT TO DISPLAY THE TIME IN A PREDEFINED TIME ZONE

This application is the U.S. national phase of International Application No. PCT/EP2021/084101 filed Dec. 3, 2021, which designated the U.S. and claims priority to CH Patent Application No. 01549/20 filed Dec. 7, 2020, the entire contents of each of which are hereby incorporated by reference.

TECHNICAL FIELD

The present invention relates to a display device for a timepiece movement comprising an hour display wheel intended to carry an hour display organ for a predefined time zone, and to be specifically driven by a drive wheel of the timepiece movement, a chassis intended to be rotated about a first main axis and to cooperate with indications that are static in relation to the frame of the timepiece movement in order to display information, a moveable organ mounted rotatably on the chassis about a second rotation axis distinct from the first main axis, a correction mechanism arranged so as to be able to drive the movable organ to a predefined angular position in relation to the frame of the timepiece movement, regardless of the angular position of the chassis about the first main axis.

The present invention also relates to a timepiece movement comprising such a display device, and to a timepiece comprising such a timepiece movement.

PRIOR ART

Such display devices have already been disclosed in the prior art.

For example, patent application EP 0921451 A1 describes a watch comprising a chassis defining a current-hour display hand, pivoted about a first main rotation axis, and carrying both a graduated dial and a current-minute hand, both pivoted about the same second rotation axis in relation to the chassis. The graduated dial is driven such as to have the same orientation in relation to the frame of the timepiece movement in all angular positions of the chassis. The current-minute hand is driven to display the current minute in relation to the graduated dial.

Patent CH 702422 B1 discloses a similar watch with an orbital dial for displaying the current hour. For this purpose, the corresponding display device comprises a chassis driven by the timepiece movement to pivot about a first main rotation axis. The chassis carries an hour dial pivoted about a second rotation axis, distinct from the first rotation axis, such as to have the same orientation at all times in relation to the frame of the timepiece movement. A current-hour display hand is also rotatably mounted on the chassis, and driven to rotate about the second rotation axis and display the current hour in relation to the hour dial. This document provides for a current-minute display hand to be rotatably mounted on the chassis, about the second rotation axis and, in a particular variant embodiment, for the chassis to be driven to perform one revolution in twelve or twenty-four hours to display the time in a second time zone. In this case, the chassis can be provided with an index cooperating with static hour graduations.

Other prior art documents describe displays based on the principle described above. Notably, although the various constructions differ to a greater or lesser extent, the basic principle of the display is essentially the same. This is particularly true of the two examples given above, which were nevertheless disclosed over twenty years apart.

Consequently, there is still a need to propose alternative display devices, allowing watch brands to stand out from competitors, preferably with solutions providing enhanced readability compared to known devices.

DISCLOSURE OF THE INVENTION

One main purpose of the present invention is to propose a display device with an alternative construction compared to known display devices, to provide a timepiece with an original appearance and high readability.

For this purpose, the present invention relates more specifically to a display device of the type mentioned above, characterized in that the respective angular positions of the chassis and of the display wheel are indexed in relation to each other in such a way that the angular position of the chassis about the first main axis is intended to be associated with the display of information relating to the predefined time zone, and in that the device further comprises a selection mechanism arranged:

to rotate the hour display wheel, in response to a predefined action by a user, such that it moves from a first position associated with the hour display in a first time zone to a second position associated with the hour display in a second time zone, and to simultaneously rotate the chassis in steps so that said chassis moves from a first position, associated with the display of information relating to the first time zone, to a second position, associated with the display of information relating to the second time zone.

These features make it easier to read the time in the predefined time zone compared to the aforementioned existing device, since it depends less on the shape, and more generally the appearance, of the chassis. Furthermore, the chassis does not move during normal operation of the watch, and therefore does not disturb the reading of the time. Indeed, the use of complex displays with several elements moving simultaneously can sometimes make said displays less readable, more especially since these displays are often associated with unusual spatial distributions of the display organs showing the current time. Thus, the present invention adopts the opposite approach to these complex display devices with a chassis driven by the timepiece movement, by proposing a chassis that is only moved at the request of the user and that shows static information in normal operation.

Preferably, the display wheel may be carried by the chassis and arranged to rotate about the second rotation axis.

In this case, it may further be provided that the moveable organ is a dial with hour graduations.

Thus, the hour dial may advantageously have an angular orientation such that the noon position is always positioned in alignment with the noon position of a conventional static dial, and the time in the predetermined time zone can be read normally and intuitively.

Advantageously, the display device may also comprise a display wheel for the current minute, intended to carry a display organ for the current minute, rotatably mounted on the chassis about the second rotation axis. Thus, the current time in the predefined time zone is displayed in a conventional way during normal operation of the corresponding timepiece, the user being able to adjust the position of the chassis at any time to select the display of the current time in another time zone.

It may be provided that the display device comprises a toothed wheel intended to be mounted rotatably in relation to the frame of the timepiece movement, about the first rotation axis, the toothed wheel being integral with the chassis, and that the selection mechanism comprises a control organ arranged to act on the toothed wheel and to make said gear wheel rotate by one step in response to the predefined action by the user.

In this case, where the moveable organ is a dial with hour graduations, the device may also comprise a kinematic correction linkage arranged between the moveable organ and a set of teeth intended to be mounted statically in relation to the frame of the timepiece movement, the kinematic correction linkage being arranged in such a way that for each rotation of the chassis through a given angle, the moveable organ is rotated through an angle equal to twice this given angle but in the opposite direction to the direction of rotation of the chassis.

Furthermore, where the hour display wheel is carried by the chassis and is arranged to rotate about the second rotation axis, the device may also advantageously comprise a kinematic drive linkage arranged to link the hour display wheel to the drive wheel of the timepiece movement, the kinematic drive linkage comprising a planetary gear including:

- a planetary carrier intended to be kinematically linked to the drive wheel of the timepiece movement and carrying at least one planetary wheel engaged with the hour display wheel, and
- a sun disc engaged with the planetary wheel and kinematically linked to a set of teeth intended to be mounted statically in relation to the frame of the timepiece movement.

In general, the display device may preferably also include an hour display wheel for the local time zone.

The present invention also relates to a timepiece movement with the aforementioned features, as well as to a timepiece comprising such a timepiece movement associated with a support mounted statically in relation to the frame of the timepiece movement and bearing indications relating to time zones enabling said time zones to be identified.

BRIEF DESCRIPTION OF THE DRAWINGS

Other features and advantages of the present invention are set out more clearly in the detailed description below of a preferred embodiment, with reference to the attached drawings provided by way of non-limiting example, in which.

EMBODIMENT(S) OF THE INVENTION

Figure 1:
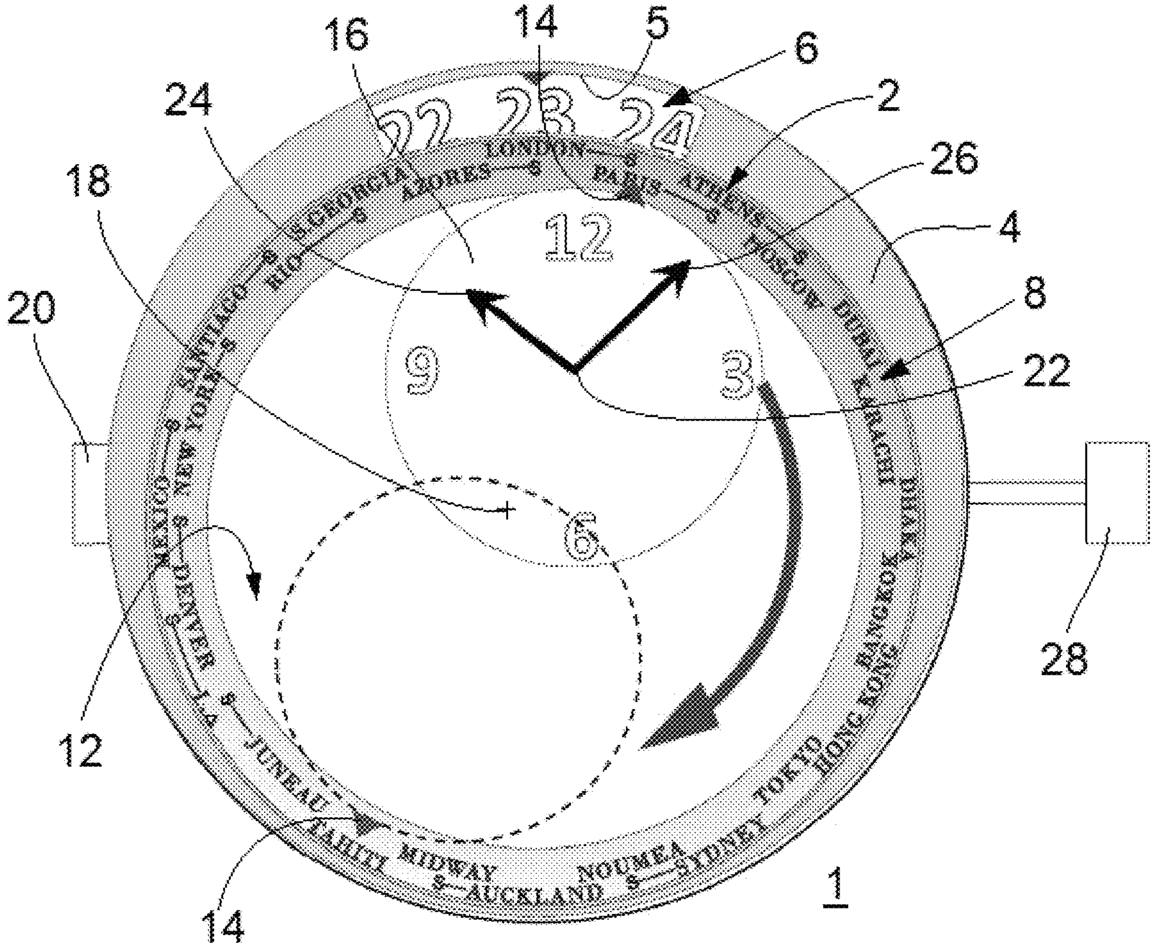
FIG. 1 is a schematic front view of a portion of a timepiece comprising a display device according to a preferred embodiment of the present invention.

FIG. 1 is a schematic view of a portion of a timepiece 1 comprising a display device 2 according to a preferred embodiment of the present invention, clearly showing its general principle. Naturally, FIG. 1 and the detailed description thereof below are provided as an illustrative example and the person skilled in the art will be able to make adaptations to fit his own needs without necessarily going beyond the scope of the invention as defined by the claims.

The display device 2 according to the present invention can be integrated directly into a timepiece movement or can be assembled with a basic timepiece movement as an additional module without thereby going beyond the scope of the invention. A display device 2 in the form of an additional display module is described below for the sake of simplicity of the present disclosure. The structural details of the basic timepiece movement will not be discussed here, for the sake of conciseness and simplicity, since the implementation of the present invention does not depend directly on such details.

The timepiece 1 conventionally comprises a case housing a timepiece movement (not shown) surmounted by a dial 4 having a substantially overall annular shape in this case.

The dial 4 has an aperture 5 showing a portion of a disk 6 displaying the hour in the local time zone (home time). The disk 6 is graduated over 24 hours and is driven by the timepiece movement to make a complete revolution in 24 hours by rotating counterclockwise.

Furthermore, the dial 4 has an annular portion 8, about the inner periphery thereof, bearing city names regularly distributed about the whole of said periphery, each city name being associated with a clearly defined time zone. Some city names are associated with an "- - -s" marking, in which case the "s" is positioned in line with the adjacent city name, to indicate the difference relating to daylight-saving time.

The center of the dial 4 is hollow to enable a mechanism for displaying the time in an additional, predefined, time zone to be arranged therein. This mechanism comprises a chassis (reference number 10 in FIG. 2) carrying an optional closing plate 12 intended to conceal the timepiece movement, a time zone index 14 intended to cooperate with the city names on the annular portion 8, as well as a secondary dial 16 preferably showing hour graduations. The display device 2 can for example be carried by the main plate of a basic timepiece movement.

As explained in the description below, the display device 2 has a selection mechanism arranged to enable a user to rotate the chassis 10 about a first main rotation axis 18, in this case at the center of the central opening of the dial 4. The timepiece 1 can advantageously be provided with a push-piece for this purpose, connected to the selection mechanism in such a way that each time the user presses the push-piece 20, the chassis 10 rotates by one step, in a given direction of rotation, in this case clockwise, as a non-limiting illustrative example.

According to the non-limiting embodiment illustrated, the annular portion 8 of the dial 4 shows twenty-four city names, defining a same number of different positions of the chassis 10 each of which is associated with the display of the current time in the corresponding time zone. Thus, the display device 2, according to the embodiment illustrated, is arranged in such a way that the chassis 10 performs a complete revolution about itself, in steps of $1/24^{th}$ of one revolution, in response to twenty-four successive presses of the push-piece 20 by the user.

FIG. 1 shows, in dashed lines, the angular position that the dial 16 would occupy after twelve presses from the position shown in solid lines. As shown, the index 14 acts as a standard indicator hand, in relation to the city names, to facilitate reading the city name that the dial 16 is facing.

The dial 16 is mounted rotatably on the chassis 10 about a second rotation axis 22 and is connected to a correction mechanism arranged to keep the angular orientation of the dial 16 constant in relation to the frame of the timepiece movement.

The chassis 10 also bears current-time display organs in the predefined time zone, in this case an hour hand 24 and a minute hand 26, both arranged to rotate about the second rotation axis 22. Thus, the two hands 24 and 26 are driven not only to display the current time in the predefined time zone, but also to correct the positions thereof when the chassis 10 and thus the dial 16 are rotated by the user, as will be described below.

The timepiece 1 also includes a time-setting crown 28 that can advantageously have an axial position in which rotation thereof corrects the time in a synchronized manner in the local time zone and in the additional time zone. It may be advantageous to also provide an additional axial position of the crown 28 in which the rotation thereof allows the time in the local time zone or in the additional time zone to be corrected independently of the time in the other time zone.

Figure 2:
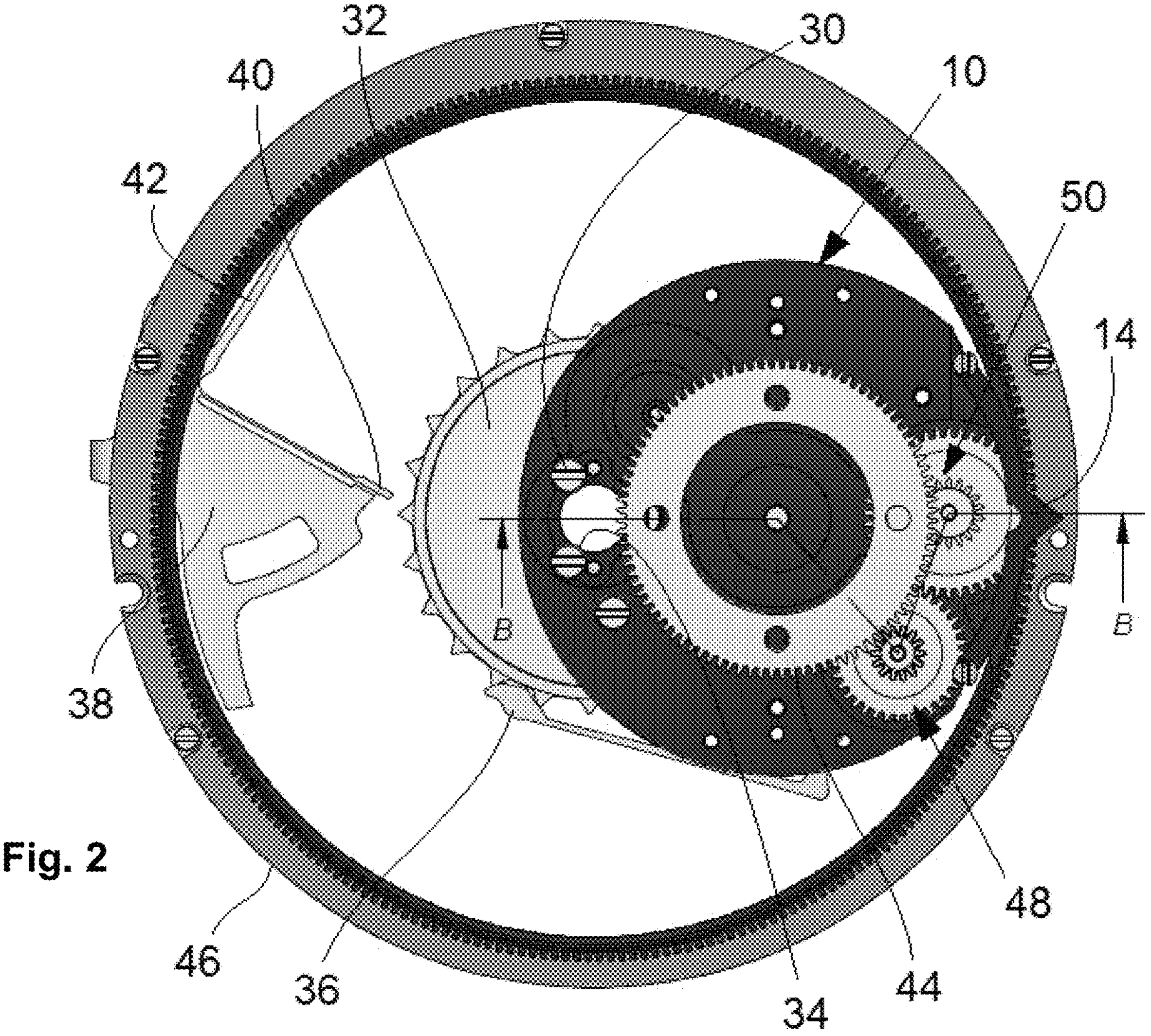
FIG. 2 is a simplified front view of a portion of the display device according to the preferred embodiment of FIG. 1.
Figure 3:
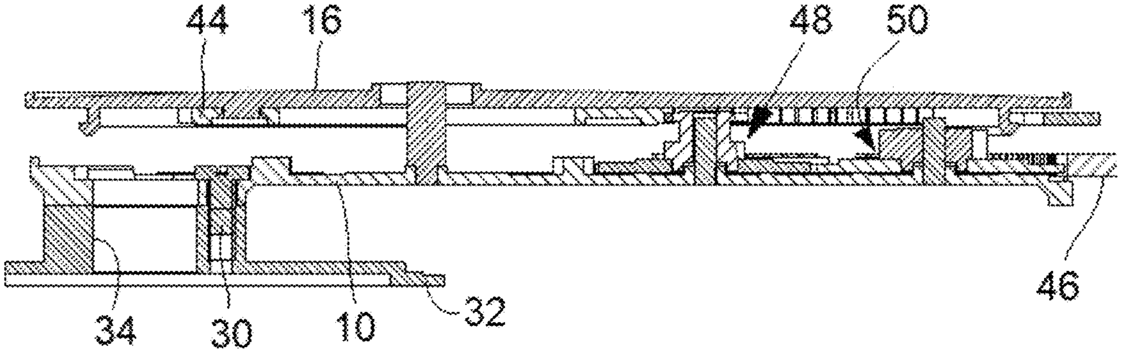
FIG. 3 is a simplified cross-section view of the components shown in FIG. 2, along the cutting line B-B shown in FIG. 2.
Figure 4:
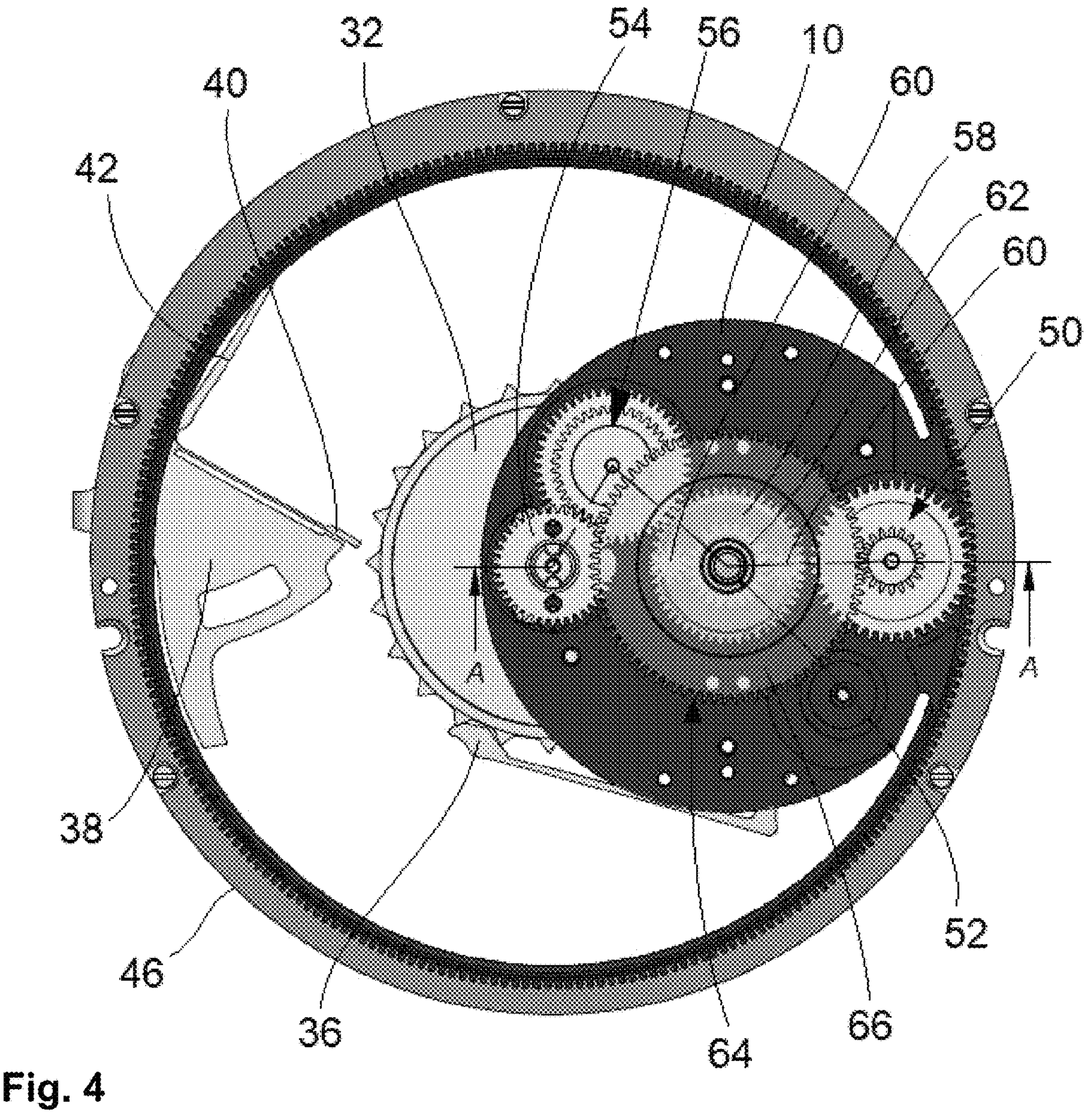
FIG. 4 is a simplified front view of another portion of the display device according to the preferred embodiment of FIG. 1.
Figure 5:
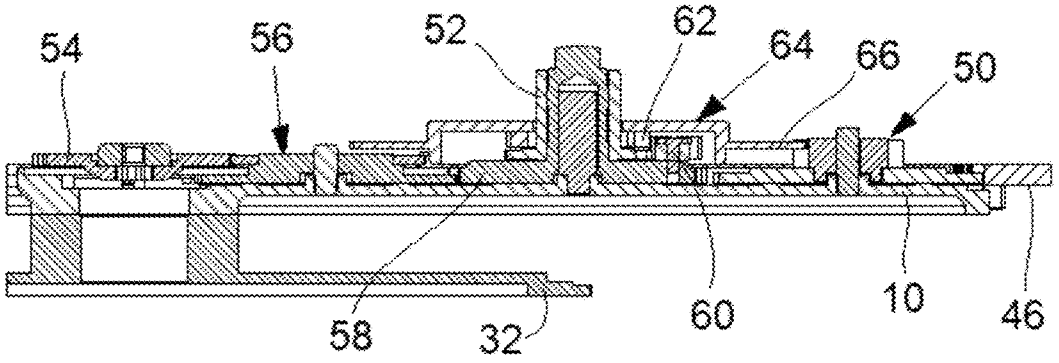
FIG. 5 is a simplified cross-section view of the components shown in FIG. 4, along the cutting line A-A shown in FIG. 4.

A preferred example of the construction of the display device 2 is set out below with reference to FIGS. 2 to 5. FIGS. 2 and 3 are simplified views, respectively front and cross-section views, of a portion of the display device 2 notably maintaining the angular orientation of the dial 16 when the chassis is moved, while FIGS. 4 and 5 are simplified views, respectively front and cross-section views, of a portion of the display device 2 ensuring the appropriate drive of the hour hands 24 and the minute hands 26 on the dial 16.

The chassis 10 is made integral with a toothed wheel 32, in this case by three screws 30, this toothed wheel 32 being mounted rotatably on a component (not illustrated, for example the plate) of the frame of the timepiece movement, about the first rotation axis 18. The chassis 10 and the toothed wheel 32 have openings aligned with the first rotation axis 18 that define a passage 34, the function of which will be explained below.

In this case, the toothed wheel 32 has twenty-four teeth in cooperation with a jumper 36 to define the twenty-four different angular positions of the chassis 10 in relation to the timepiece movement.

It also appears from the view of FIG. 2 that the push-piece 20 is intended to cooperate with a selection mechanism enabling selection of the angular position occupied by the chassis 10 in relation to the timepiece movement. Thus, the push-piece 20 can more specifically be arranged to act on a control organ, in this case a selection lever 38 that rotates in relation to the frame of the timepiece movement.

The selection lever 38 is positioned and dimensioned to cooperate with the teeth of the toothed wheel 32 in response to the user pressing the push-piece 20, such that pressure on the push-piece 20 rotates the toothed wheel 32 by one step, allowing the user to move from one time zone to the next. For this purpose, the selection lever 38 includes an actuating beak 40 provided at the free end of a resilient arm enabling the actuating beak 40 to be retracted when the selection lever 38 returns to the idle position (as shown in FIG. 2), under the action of an integrated resilient return member 42. Naturally, the present invention is not limited to the embodiment of the selection lever 38 specifically illustrated and described, and the person skilled in the art will not have any particular difficulty in adapting the present teaching according to his requirements, without thereby going beyond the scope of the invention as defined by the claims.

The chassis 10 also carries a toothed ring 44 intended to carry the dial 16 and to allow said dial to be driven in rotation in relation to the chassis 10. For this purpose, the toothed ring 44 is mounted on the chassis 10 so that it can rotate freely in relation to the chassis.

The toothed ring 44 is linked to a static toothed ring 46, through a kinematic correction linkage keeping the angular orientation of the dial 16 constant in relation to the frame of the timepiece movement. In this case, the kinematic correction linkage comprises a first intermediate wheel 48, the pinion of which is engaged with the toothed ring 44 and the wheel of which is engaged with the wheel of a second intermediate wheel 50, which is itself engaged with the teeth of the static toothed ring 46.

The kinematic correction linkage advantageously has a gear ratio such that the dial 16 rotates $1/12^{th}$ of a revolution about the second rotation axis 22 each time the chassis 10 rotates $1/24^{th}$ of a revolution about the first rotation axis 18 (the chassis 10 and the dial 16 rotating in opposite directions).

Thus, in normal operation, i.e. when the timepiece 1 is showing the time normally, without user intervention, the chassis 10 and the dial 16 have respective static positions/orientations. When the user wishes to modify the additional time zone, the time of which is indicated by the hour hand 24, in relation to the dial 16, he presses the push-piece 20 as many times as necessary to rotate the chassis 10 until the index 14 faces the desired city name, the angular orientation of the dial 16 being kept unchanged by the kinematic correction linkage.

The drive of the indicator hands 24 and 26 facing the dial 16 is explained in more detail below with reference to FIGS. 4 and 5. The hands 24 and 26 must be driven to indicate the current time in the predefined time zone, and be driven in such a way as to indicate the current time while keeping the same angular reference frame, i.e. the dial 16 having a constant angular orientation, when the chassis 10 is pivoted.

The display device 2 comprises a kinematic drive linkage arranged to connect an hour display wheel 52, intended to carry the hour hand 24 of the predefined time zone, to a drive wheel (not shown) of the timepiece movement. This kinematic drive linkage includes an additional cannon pinion 54 intended to be driven from the drive wheel of the timepiece movement to make a complete revolution, about the first rotation axis 18, in one hour. The movement of the drive wheel of the timepiece movement is transmitted to the additional cannon pinion 54 through the passage 34. The rotational movement of the additional cannon pinion 54 is therefore independent of any rotational movements of the chassis 10.

The additional cannon pinion 54 is engaged with a first wheel of an intermediate drive wheel 56 having a second wheel engaged with a time-zone cannon pinion 58, arranged on the chassis 10 to pivot about the second rotation axis 22 and intended to carry the minute hand 26.

The time-zone cannon pinion 58 carries two planetary wheels 60 engaged with the teeth of the hour display wheel 52. At the same time, each planetary wheel 60 is also engaged with the teeth of a sun disc 62 coaxial with the hour display wheel 52.

The sun disc 62 is part of a sun wheel 64 which also carries a compensating sun disc 66 engaged with a pinion of the second intermediate wheel 50 engaged with the static toothed ring 46. The discs 62 and 66 are therefore constrained to rotate together.

In normal operation, i.e. when the timepiece 1 is running without any intervention from the user, notably to rotate the chassis 10, the sun disc 62 is static as far as it is kinematically connected to the fixed toothed ring 46. The respective teeth of the hour display wheel 52 and of the sun disc 62 have substantially identical pitch-diameters but slightly different numbers of teeth, so that when the planetary wheels 60 roll on the static teeth of the sun disc 62, said wheels induce a slight rotation of the hour display wheel 52 in the clockwise direction of rotation, at a rotational speed such that it completes one revolution in twelve hours. The operating principle of this particular motion-work is not described in detail here, as it has already been disclosed in an earlier patent application, published as CH 715546 A2, the teaching of which is incorporated herein by reference as far as the implementation of the link between the time-zone cannon pinion 58 and the hour display wheel 52 is concerned.

It is also apparent from the foregoing that the wheels arranged to rotate about the second rotation axis 22 form a planetary gear that is activated when the user acts on the push-piece 20 to rotate the chassis 10. During such an operation, the time-zone cannon pinion 58 continues to act as a first input for the planetary gear, via its link with the drive wheel of the timepiece movement, but also acts as a planetary carrier, with the planetary wheels 60. The sun disc 62, engaged with the planetary wheels 60, acts as a second input since said sun disc is driven by the second intermediate wheel 50, forced to roll on the teeth of the static toothed ring 46 when the chassis 10 rotates about the first rotation axis 18. The hour display wheel 52 acts as an output by driving the hour hand 24 of the predefined time zone according to a resultant of the movements of the time-zone cannon pinion 58 and of the chassis 10. Thus, during rotation of the chassis 10, the planetary wheels 60 are driven by the sun disc 62 to rotate faster than during normal operation and to drive the hour hand 24 so as to switch from displaying the time in a first time zone to displaying the time in a second time zone in a time corresponding to the movement time of the chassis 10, in response to the action of the user on the push-piece 20.

The gear ratios involved in the planetary gear, and between the planetary gear and the static toothed ring 46, are adjusted so that when the chassis rotates $1/24^{th}$ of one revolution, the hour hand 24 rotates $1/12^{th}$ of one revolution (in this case, in the same direction of rotation).

It should be noted that the drive wheel of the timepiece movement can for example be a conventional cannon pinion (possibly modified so as not to have the standard cannon intended to carry the minute hand), which would also be connected to the local time display organ. Thus, the time-setting crown 28 can be arranged to act in a conventional way on the cannon pinion of the timepiece movement in order to correct the time, the corresponding movements of the cannon pinion being then simultaneously transferred to both the local-time display organ 6 and the display organ 24 in the predefined time zone.

It is clear from the foregoing description that the present invention provides an original and particularly readable display device 2, while having a limited total number of components, thereby requiring a relatively small number of modifications to be made to a basic timepiece movement.

The above description is intended to describe a particular embodiment by way of illustrative and non-limiting example, and the invention is not limited to the implementation of certain specific features described above, such as the nature of the information displayed by the various display organs described, or the shape and manner in which certain components are made, since said components can be modified without affecting implementation of the present invention, for example the shape of the chassis 10 or of the components of the selection mechanism. In particular, it should be noted that the chassis 10 may carry a single display organ in a position, controlled in relation to the frame of the timepiece movement, that would allow the intuitive reading of the displayed information, without necessarily requiring a graduated dial with an angular orientation that would have to be kept static. In this case, the information displayed could be different from the time in a predefined time zone and the hour display wheel 52 could be arranged to pivot about the first rotation axis 18, without thereby going beyond the scope of the invention. Similarly, the minute display hand 26 could also be arranged to pivot about the first rotation axis 18, regardless of the position of the hour display hand 24, without thereby going beyond the scope of the invention. Furthermore, the chassis 10 may have a different shape, possibly larger to enable the chassis to carry one or more additional display wheels, possibly associated with an additional orbital dial (moving at the user's request). Furthermore, when displaying the time in an additional time zone, the time may also be displayed for the half-hour time zones by providing variable pitches for the teeth of the toothed wheel 32, without thereby going beyond the scope of the present invention as defined by the claims.

The invention claimed is:

1. A display device, for a timepiece movement, comprising an hour display wheel intended to carry an hour display organ for a predefined time zone, and to be specifically driven by a drive wheel of the timepiece movement, a chassis intended to be rotated about a first main axis and to cooperate with indications that are static in relation to a frame of the timepiece movement in order to display information, a moveable organ mounted rotatably on said chassis about a second rotation axis distinct from said first main axis, a correction mechanism arranged so as to be able to drive said moveable organ to a predefined angular position in relation to the frame of the timepiece movement, regardless of the angular position of said chassis about said first main axis, wherein the respective angular positions of said chassis and of said hour display wheel are indexed in relation to each other in such a way that the angular position of said chassis about said first main axis is intended to be associated with the display of static information relating to said predefined time zone, and the display device further comprising a selection mechanism arranged:

to rotate said hour display wheel, in response to a predefined action by a user, such that said hour display wheel moves from a first position associated with the hour display in a first time zone to a second position associated with the hour display in a second time zone, and—to simultaneously rotate said chassis in steps so that said chassis moves from a first position, associated with the display of information relating to said first time zone, to a second position, associated with the display of information relating to said second time zone.

2. The display device of claim 1, wherein said hour display wheel is carried by said chassis and arranged to rotate about said second rotation axis.

3. The display device of claim 2, wherein said moveable organ is a dial with hour graduations.

4. The display device of claim 3, further comprising a display wheel for current minute, intended to carry a display organ for current minute, rotatably mounted on said chassis about said second rotation axis.

5. The display device of claim 3,
further comprising a toothed wheel intended to be mounted rotatably in relation to the frame of the timepiece movement, about said first main axis, said toothed wheel being integral with said chassis, and
wherein said selection mechanism comprises a control organ arranged to act on said toothed wheel and to make said toothed wheel rotate by one step in response to said predefined action by the user.

6. The display device of claim 5, further comprising a kinematic correction linkage arranged between said dial and a set of teeth intended to be mounted statically in relation to the frame of the timepiece movement, said kinematic correction linkage being arranged in such a way that for each rotation of said chassis through a given angle, said dial is rotated through an angle equal to twice said given angle but in the opposite direction to the direction of rotation of said chassis.

7. The display device of claim 3, further comprising a kinematic drive linkage arranged to connect said hour display wheel to the drive wheel of the timepiece movement, said kinematic drive linkage comprising a planetary gear comprising:
a planetary carrier intended to be kinematically linked to the drive wheel of the timepiece movement and carrying at least one planetary wheel engaged with said hour display wheel, and
a sun disc engaged with said at least one planetary wheel and kinematically linked to a set of teeth intended to be mounted statically in relation to the frame of the timepiece movement.

8. The display device of claim 3, further comprising an hour display wheel for the local time zone.

9. The display device of claim 2, further comprising a display wheel for current minute, intended to carry a display organ for current minute, rotatably mounted on said chassis about said second rotation axis.

10. The display device of claim 2, further comprising a kinematic drive linkage arranged to connect said hour display wheel to the drive wheel of the timepiece movement, said kinematic drive linkage comprising a planetary gear comprising:
a planetary carrier intended to be kinematically linked to the drive wheel of the timepiece movement and carrying at least one planetary wheel engaged with said hour display wheel, and
a sun disc engaged with said at least one planetary wheel and kinematically linked to a set of teeth intended to be mounted statically in relation to the frame of the timepiece movement.

11. The display device of claim 2,
further comprising a toothed wheel intended to be mounted rotatably in relation to the frame of the timepiece movement, about said first main axis, said toothed wheel being integral with said chassis, and
wherein said selection mechanism comprises a control organ arranged to act on said toothed wheel and to make said toothed wheel rotate by one step in response to said predefined action by the user.

12. The display device of claim 11, in which said moveable organ is a dial with hour graduations, the display device further comprising a kinematic correction linkage arranged between said dial and a set of teeth intended to be mounted statically in relation to the frame of the timepiece movement, said kinematic correction linkage being arranged in such a way that for each rotation of said chassis through a given angle, said dial is rotated through an angle equal to twice said given angle but in the opposite direction to the direction of rotation of said chassis.

13. The display device of claim 12, further comprising a kinematic drive linkage arranged to connect said hour display wheel to the drive wheel of the timepiece movement, said kinematic drive linkage comprising a planetary gear comprising: —a planetary carrier intended to be kinematically linked to the drive wheel of the timepiece movement and carrying at least one planetary wheel engaged with said hour display wheel, and
a sun disc engaged with said at least one planetary wheel and kinematically linked to a set of teeth intended to be mounted statically in relation to the frame of the timepiece movement.

14. The display device of claim 11, further comprising a kinematic drive linkage arranged to connect said hour display wheel to the drive wheel of the timepiece movement, said kinematic drive linkage comprising a planetary gear comprising:
a planetary carrier intended to be kinematically linked to the drive wheel of the timepiece movement and carrying at least one planetary wheel engaged with said hour display wheel, and
a sun disc engaged with said at least one planetary wheel and kinematically linked to a set of teeth intended to be mounted statically in relation to the frame of the timepiece movement.

15. The display device of claim 2, further comprising an hour display wheel for the local time zone.

16. The display device of claim 1,
further comprising a toothed wheel intended to be mounted rotatably in relation to the frame of the timepiece movement, about said first main axis, said toothed wheel being integral with said chassis, and
wherein said selection mechanism comprises a control organ arranged to act on said toothed wheel and to make said toothed wheel rotate by one step in response to said predefined action by the user.

17. The display device of claim 16, in which said moveable organ is a dial with hour graduations, the display device further comprising a kinematic correction linkage arranged between said dial and a set of teeth intended to be mounted statically in relation to the frame of the timepiece movement, said kinematic correction linkage being arranged in such a way that for each rotation of said chassis (10) through a given angle, said dial is rotated through an angle equal to twice said given angle but in the opposite direction to the direction of rotation of said chassis.

18. The display device of claim 1, further comprising an hour display wheel for the local time zone.

19. A timepiece movement comprising a display device including an hour display wheel intended to carry an hour display organ for a predefined time zone, and to be specifically driven by a drive wheel of the timepiece movement, a chassis intended to be rotated about a first main axis and to cooperate with indications that are static in relation to a frame of the timepiece movement in order to display information, a moveable organ mounted rotatably on said chassis about a second rotation axis distinct from said first main axis, a correction mechanism arranged so as to be able to drive said moveable organ to a predefined angular position in relation to the frame of the timepiece movement, regardless of the angular position of said chassis about said first main axis, wherein the respective angular positions of said chassis and of said hour display wheel are indexed in relation to each other in such a way that the angular position of said chassis about said first main axis is intended to be associated with the display of static information relating to said predefined time zone, and the display device further comprising a selection mechanism arranged: —to rotate said hour display wheel, in response to a predefined action by a user, such that said hour display wheel moves from a first position associated with the hour display in a first time zone to a second position associated with the hour display in a second time zone, and to simultaneously rotate said chassis in steps so that said chassis moves from a first position, associated with the display of information relating to said first time zone, to a second position, associated with the display of information relating to said second time zone.

20. A timepiece comprising a timepiece movement including a display device comprising an hour display wheel intended to carry an hour display organ for a predefined time zone, and to be specifically driven by a drive wheel of the timepiece movement, a chassis intended to be rotated about a first main axis and to cooperate with indications that are static in relation to a frame of the timepiece movement in order to display information, a moveable organ mounted rotatably on said chassis about a second rotation axis distinct from said first main axis, a correction mechanism arranged so as to be able to drive said moveable organ to a predefined angular position in relation to the frame of the timepiece movement, regardless of the angular position of said chassis about said first main axis, wherein the respective angular positions of said chassis and of said hour display wheel are indexed in relation to each other in such a way that the angular position of said chassis about said first main axis is intended to be associated with the display of static information relating to said predefined time zone, and the display device further comprising a selection mechanism arranged: —to rotate said hour display wheel, in response to a predefined action by a user, such that said hour display wheel moves from a first position associated with the hour display in a first time zone to a second position associated with the hour display in a second time zone, and to simultaneously rotate said chassis in steps so that said chassis moves from a first position, associated with the display of information relating to said first time zone, to a second position, associated with the display of information relating to said second time zone, the timepiece further including a support mounted statically in relation to said frame of said timepiece movement and bearing indications relating to time zones enabling said time zones to be identified.

* * * * *